(No Model.) 4 Sheets—Sheet 1.

L. S. HOGEBOOM & F. B. SMITH.
BRAN DUSTER.

No. 279,387. Patented June 12, 1883.

Witnesses:
Philip C. Masi.
E. H. Bates

Inventors,
L. S. Hogeboom,
Frank B. Smith,
by Anderson & Smith
their Attorneys (No Model.) 4 Sheets—Sheet 2.

L. S. HOGEBOOM & F. B. SMITH.
BRAN DUSTER.

No. 279,387. Patented June 12, 1883.

Witnesses:
Philip C. Mau.
E. H. Bates.

Inventors
L. S. Hogeboom,
Frank B. Smith,
by Anderson & Smith
their Attorneys.

(No Model.) 4 Sheets—Sheet 3.
L. S. HOGEBOOM & F. B. SMITH.
BRAN DUSTER.

No. 279,387. Patented June 12, 1883.

Witnesses:
Philip C. Masi.
E. H. Bates.

Inventors:
L. S. Hogeboom,
Frank B. Smith,
by Anderson & Smith
their
Attorneys.

(No Model.) 4 Sheets—Sheet 4.

L. S. HOGEBOOM & F. B. SMITH.
BRAN DUSTER.

No. 279,387. Patented June 12, 1883.

Witnesses:
Philip Masi.
E. H. Bates.

Inventors,
L. S. Hogeboom,
Frank B. Smith.
by Anderson & Smith
their Attorneys.

UNITED STATES PATENT OFFICE.

LEVI S. HOGEBOOM AND FRANK. B. SMITH, OF THREE RIVERS, MICHIGAN.

BRAN-DUSTER.

SPECIFICATION forming part of Letters Patent No. 279,387, dated June 12, 1883.

Application filed January 26, 1883. (No model.)

*To all whom it may concern:*

Be it known that we, L. S. HOGEBOOM and F. B. SMITH, citizens of the United States, resident at Three Rivers, in the county of St. Joseph and State of Michigan, have invented certain new and useful Improvements in Bran-Dusters; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
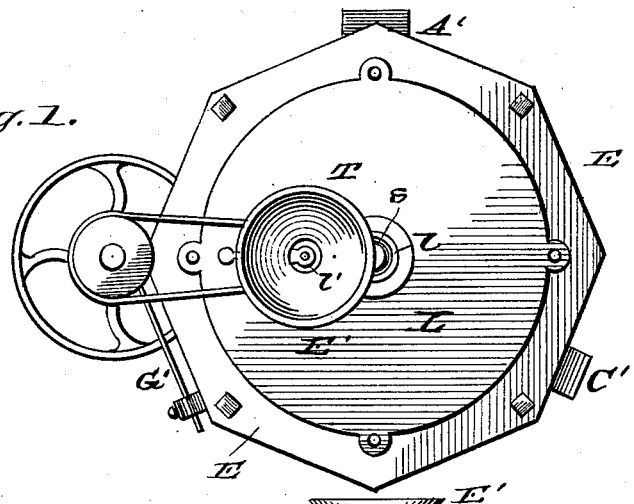
Figure 2:
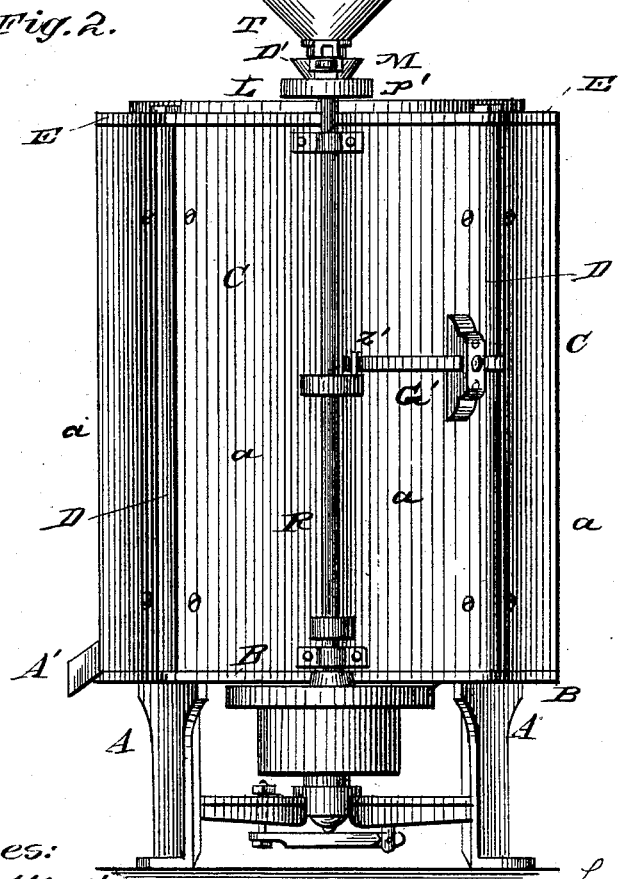
Figure 3:
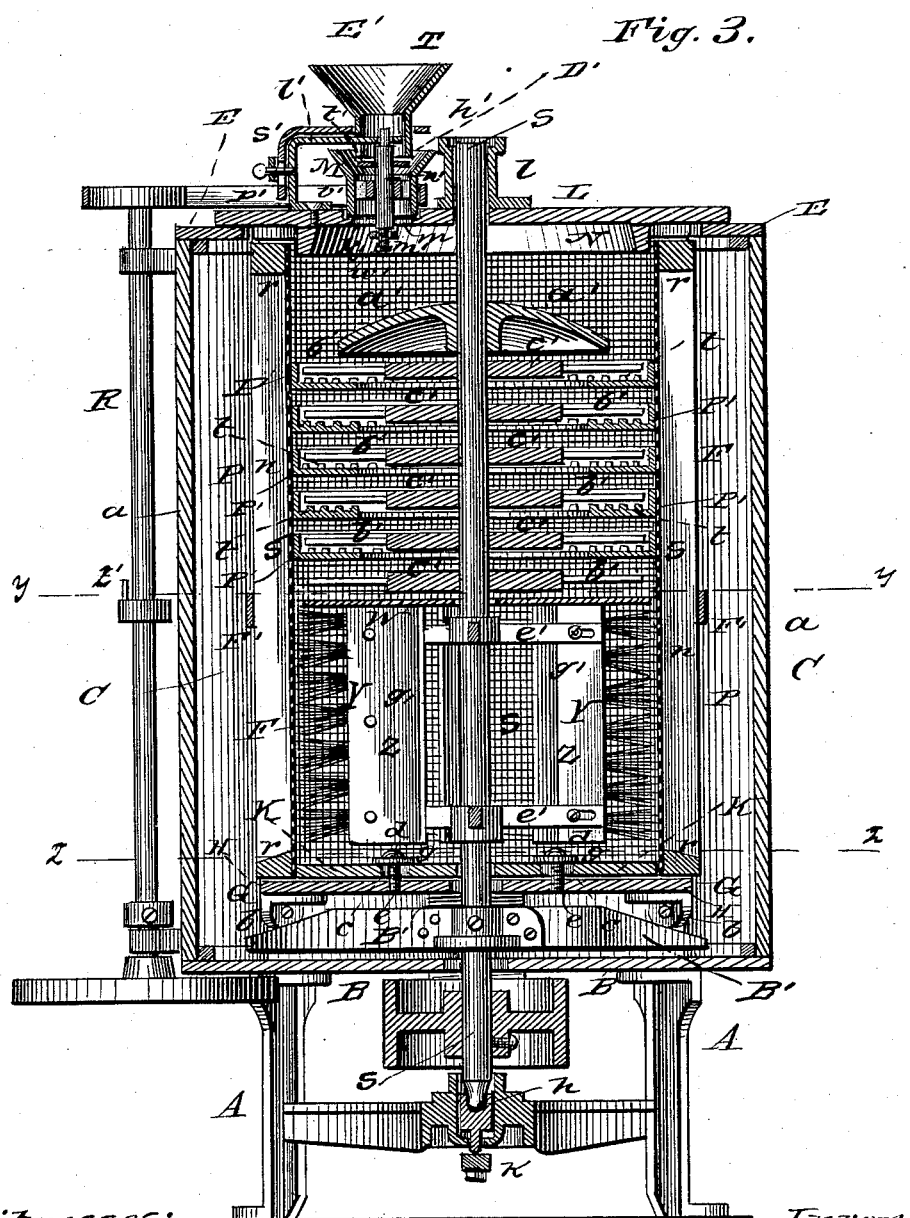
Figure 4:
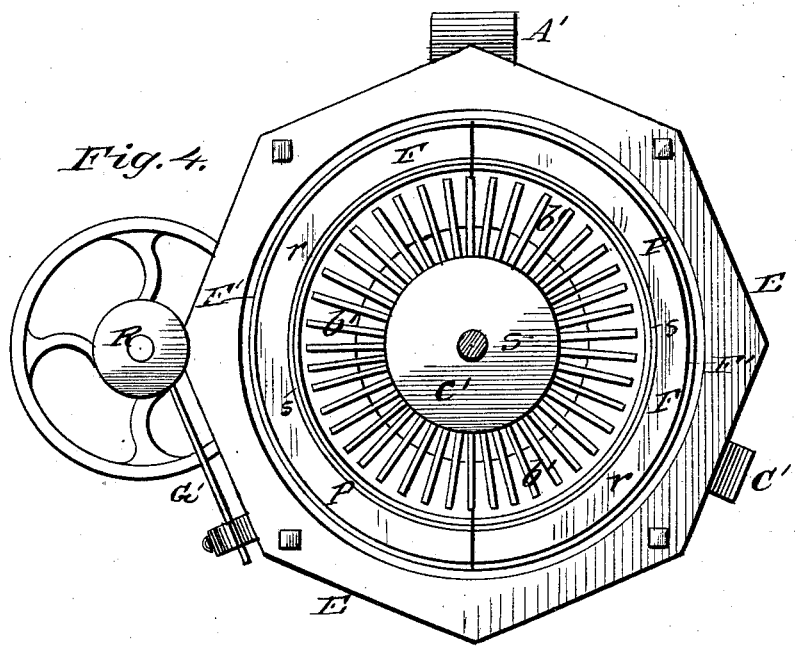
Figure 5:
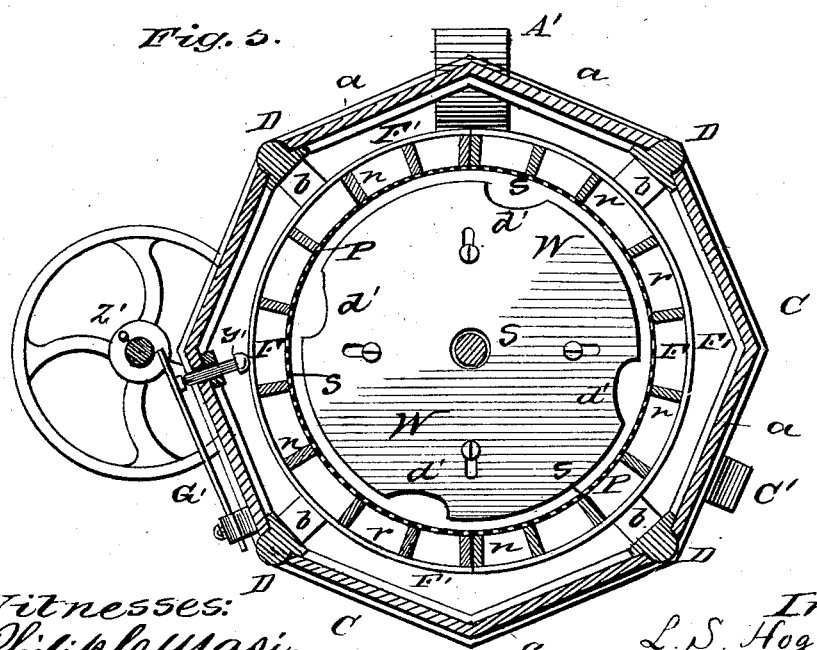
Figure 6:
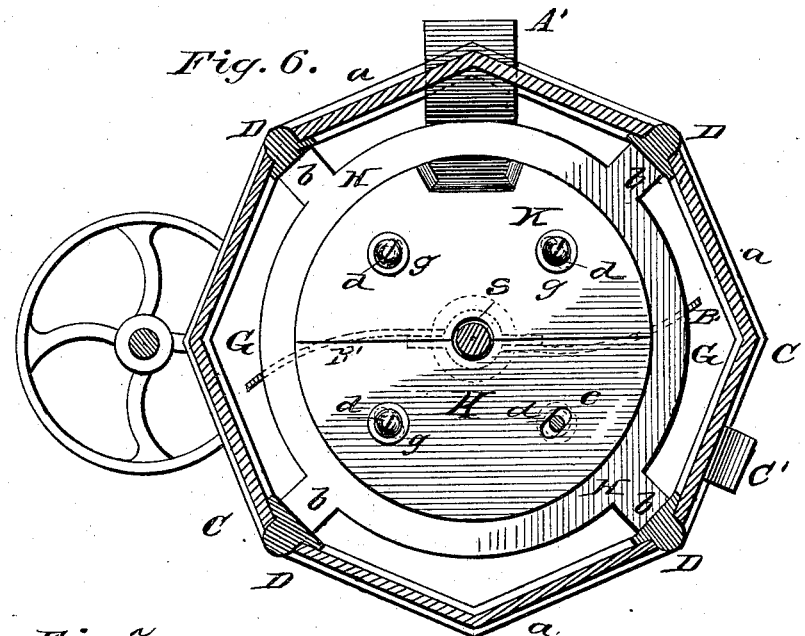
Figure 7:
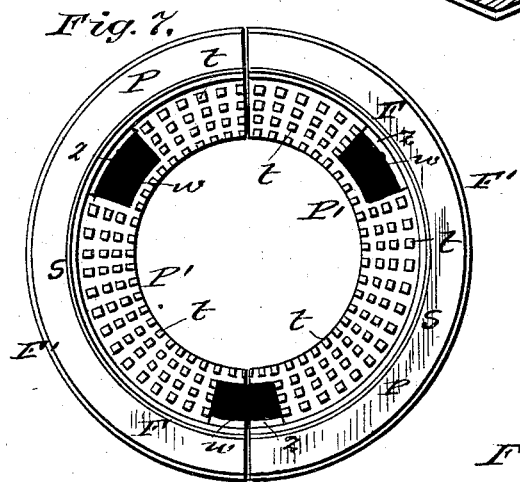
Figure 8:
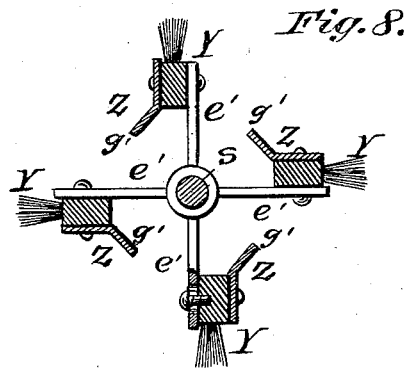
Figure 9:
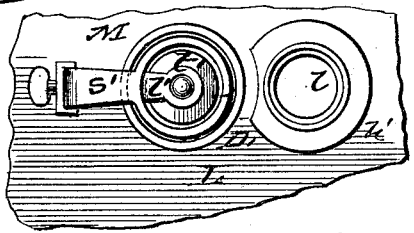
Figure 10:

Figure 1 of the drawings is a plan view of our machine. Fig. 2 is a side view. Fig. 3 is a vertical sectional view. Fig. 4 is a plan view, top removed. Fig. 5 is a cross-section taken through $y\ y$. Fig. 6 is a cross-section taken through $z\ z$. Figs. 7, 8, 9, and 10 are detail views.

This invention has relation to machines for cleaning and dusting bran; and it consists in the construction and novel arrangement of devices hereinafter set forth, and particularly pointed out in the appended claims.

In the annexed drawings, the letter A designates the supporting frame-work, carrying the base-plate or bottom B of the outer or flour case, C.

D represents the uprights of the outer case, to which the boards $a$, forming the outer wall of said case, are secured. The annular top plate, E, is secured to the upper ends of the uprights D. The central opening of the annular plate E is of sufficient diameter to allow the inner or bran case, F, to be introduced or removed without taking it to pieces.

G represents the base-support of the inner case. This consists of a spider-plate, H, having peripheral arms $b$, which are bolted to the uprights D of the outer wall. An adjustable centering-plate, K, is seated on the spider-plate H. This centering-plate is made of proper diameter to fit neatly within the annular lower edge of the cylindrical inner wall. In the plate K are made enlarged openings or slots $c$, which are adapted to receive bolts $d$, which pass through perforations $e$ in the spider-plate H. The bolts $d$ are provided with washers $g$ or covering-plates, which protect the slots $c$. These slots are of sufficient size to permit the adjustment of the center plate, K, which is designed to hold the inner-case wall true with reference to the vertical center shaft and its arms. The plates H and K are provided with central openings, through which the vertical shaft extends downward to its pivot-bearing $h$, which is usually cup-shaped, and supported by an adjustable arm, $k$. The center plate, K, is usually made in two pieces, which abut diametrically.

L indicates the top of the outer case, C, which is bolted to the top ring or annular plate, E. This top or plate L is provided with a central bearing, $l$, for the upper end of the vertical shaft, and eccentric thereto an opening, $m$, for the hopper M.

To the under side of the top plate, E, is bolted an adjustable ring, N, which is designed to fit neatly within the upper circular rim of the inner case. The openings for the bolts in this ring N are made large enough to permit the ring to be adjusted, so that the upper end of the inner case, when engaged by said ring, will be centered and true to the vertical shaft and its arms.

The inner case or cylinder, F, is constructed in sections, consisting of frames P, having vertical bars $n$, joined to circular rim-sections $r$, said bars and rim-sections supporting the cylinder $s$, which consists of fine wire-cloth, and is attached to the inner edges of the parts composing the framing.

To the upper portion of the interior wall of the inner case are secured annular shelves, P', which are arranged one above another in series, as shown in the drawings. The upper surface of each shelf is formed with a number of small rectangular studs, $t$, which are separated by circular and radial channels $v$. These studs $t$ are of even height and have flat tops, usually, as shown in the drawings.

Openings $w$ are made through the shelves at or near their outer margins for the passage of the bran from one shelf down to the next. The outer margin, $z$, of the opening $w$ is beveled inward in order to guide the bran toward the center as it slides down over this beveled margin.

S indicates the vertical shaft, to the upper portion of which is secured the round conical or shelving, running-plate, or distributer $a'$, on which the bran falls from the hopper T, which is attached to the top L of the outer case.

Below the running-plate $a'$ are the radial whippers $b'$, which are attached to the shaft S by suitable hubs, $c'$. There are several circular series of these whippers, arranged one above another, and corresponding in number to the annular shelves P'. Each series of whippers extends outward above a shelf, P', so that the whippers, during the rotation of the shaft, pass over and near the tops of the studs $t$, but do not touch the same. The action of the whippers forces the bran sharply against the studs, and is designed to take off the middlings without rubbing, in this manner avoiding red fluff.

Just below the series of shelves is a plane feeding-plate, W, which fits closely to the cloth wall of the inner case, and is provided with peripheral notches or openings $d'$, through which the bran passes downward in front of the brushes. Below this plate the shaft is provided with radial arms $e'$, which carry at their ends the brushes Y, and adjacent thereto the fan-blades Z. As the bran leaves the plane running-plate W it is acted upon at once by the brushes and by the fan-blades. In this manner the bran is kept cool and the cloth clean, so that the discharge is free. The inner portions of the fan-blades are set obliquely, as indicated at $g'$, in order to avoid a direct radial current and to cause the bran to be carried toward the brushes. The bran is finally discharged from the inner case by the spout A', which extends through the outer-case wall. The flour and middlings, having passed through the wire-cloth, drop down between the inner and outer case walls to the bottom B of the latter, whence it is discharged by the sweep B', which is attached to the shaft through an opening or spout, C', in the outer-case wall.

The upper end of the vertical shaft is journaled in a central bearing, $h'$, in the top plate, L. Eccentric thereto an opening, $k'$, is made through the top plate, and upper and lower bearings, $l'$ and $m'$, are provided for the small hopper-shaft $n'$, to which the revolving hopper or running-throat D' is attached. The external wall of this running-throat D' serves as a bearing for a belt, $p'$, which engages a pulley on a side shaft, R, by which the running-throat is turned. To the arm $l'$ is connected an adjustable arm, $s'$, which carries the receiving-hopper E'.

On the hopper-shaft is a small horizontal plate, $t'$, the diameter of which is slightly larger than that of the spout $v'$ of the hopper E'. This hopper is adjustable toward or from the plate $t'$ to decrease or increase the feed, according to requirement. The adjustment is secured by means of a set-screw, $w'$. The plate $t$ is usually made adjustable or movable up or down, so that it can be raised to engage the hopper-spout and cut off the feed when necessary in throwing off nails and extraneous substances.

Around the inner case is arranged a metallic band, F', about half-way between its upper and lower ends, and said band is provided with an arm or projection, $y'$, which extends through the outer-case wall to engage a spring-knocker, G', which is operated by studs or projections on the lateral shaft, as indicated at $z'$. Several of these bands and knockers may be employed, if necessary, their object being to communicate an intermittent jarring motion of quick character to the inner case, which will have the effect of clearing the cloth.

Having described this invention, what we claim, and desire to secure by Letters Patent, is—

1. The combination of the annular interior shelves, P', and the wire-cloth case, said shelves having their upper surfaces formed with the rectangular studs $t$, arranged to leave intervening channels, $v$, and beveled or sloping margins $z$ of the discharging-openings $w$, substantially as specified.

2. The combination, with the studded annular shelves P', of the revolving radial whippers $b'$, arranged above and out of contact with said studded shelves, substantially as specified.

3. The combination, with the series of studded shelves P' and the intermediate whippers, $b'$, out of contact therewith, of the sloping distributing-plate $a'$, above the series of shelves, and the plane running-plate W, having the peripheral feeding notches or openings $d'$ below said series of shelves, substantially as specified.

4. The combination, with the inner wire-cloth case and its annular studded shelves, of the series of radial whippers, the running plate W, the brushes Y, and the obliquely-turned fan-blades Z, substantially as specified.

5. The combination, with the inner removable bran-case, of the lower supporting spider-plate, H, the adjustable centering-plate K, the removable top plate, L, and the adjustable centering-ring N, and connecting-bolts and washers, substantially as specified.

6. The combination, with the inner case, of the jarring devices, consisting of band $p'$, around the same, the spring-knocker G', and the lateral shaft provided with the projections $z'$, substantially as specified.

7. The combination of the revolving tube D', a vertical supporting-shaft, $n'$, and the receiving-hopper, said tube being arranged under the spout of the hopper, substantially as specified.

In testimony whereof we affix our signatures in presence of two witnesses.

LEVI L. HOGEBOOM.
FRANK. B. SMITH.

Witnesses:
HENRY B. SMITH,
O. F. MILLARD.